United States Patent

[11] 3,633,066

[72] Inventors Kozo Uchida;
Naohisa Nakaya; Koji Suzuki, all of Tokyo, Japan

[21] Appl. No. 851,609
[22] Filed Aug. 20, 1969
[45] Patented Jan. 4, 1972
[73] Assignee Iwatsu Electric Company Limited
Tokyo, Japan
[32] Priority Aug. 23, 1968
[33] Japan
[31] 43/59922

[54] AUTOMATIC SYNCHRONIZING SYSTEMS FOR SAMPLING DEVICES

3 Claims, 7 Drawing Figs.

[52] U.S. Cl. ........ 315/19, 307/228, 315/25, 328/72, 328/179
[51] Int. Cl. ........ H01j 29/70
[50] Field of Search ........ 307/228; 328/63, 72, 179, 151; 315/18, 19, 22, 25

[56] References Cited
UNITED STATES PATENTS

| | | | |
|---|---|---|---|
| 3,432,762 | 3/1969 | La Porta | 328/179 |
| 3,571,617 | 3/1971 | Hainz | 307/228 |

*Primary Examiner*—Rodney D. Bennett, Jr.
*Assistant Examiner*—H. A. Birmiel
*Attorney*—Chittick, Pfund, Birch, Samuels & Gauthier

ABSTRACT: In a sampling device including a synchronizing device comprising a synchronizing circuit, a sampler, an oscilloscope, and a synchronism control circuit having a differentiation circuit to differentiate the output from the sampler to vary a variable element in the synchronizing circuit whereby to stop variation of the variable element and to maintain the same in the stopped condition upon reaching synchronism there is provided means to stop the operation of the synchronism control circuit over the flyback interval of a low-speed sawtooth wave supplied to one deflection axis of the oscilloscope to prevent loss of synchronization which otherwise tends to occur during the flyback interval.

INVENTOR

BY Chittick, Pfund, Birch Samuels & Gauthier ATTORNEY

INVENTOR

BY Chittick, Pfund, Birch Samuels + Gauthier ATTORNEY

AUTOMATIC SYNCHRONIZING SYSTEMS FOR SAMPLING DEVICES

CROSS REFERENCE TO RELATED APPLICATIONS

This application is related to applications Ser. No. 851,588, filed Aug. 20, 1969, entitled AUTOMATIC SYNCHRONIZING SYSTEM and Ser. No. 851,589 dated Aug. 20, 1969, entitled AUTOMATIC SYNCHRONIZING SYSTEM, filed on even date herewith.

BACKGROUND OF THE INVENTION

This invention relates to an automatic synchronizing system for a sampling device which utilizes a synchronism control circuit for automatically and stably deriving an output pulse synchronized with a synchronizing signal input and more particularly to a novel automatic synchronizing system in which the operation of the synchronism control circuit is stopped temporary over the flyback period of a low-spaced sawtooth wave supplied to the X-axis of an oscilloscope whereby to prevent occurrence of disturbances in the synchronism.

In the automatic synchronizing system utilizing a sampling device utilizing such a synchronism control circuit, the frequency, amplitude and waveform of the synchronizing input signal vary in various manners so that in the prior art synchronizing circuit for obtaining output pulses which are synchronous with such input signals of various forms it has been usual to manually vary the synchronizing level of the input signals or the synchronizing circuit is constructed to operate under self-excitation condition wherein the self-excitation frequency thereof is varied manually. In other words, while observing the waveform displayed by an oscilloscope and the like the operator varies manually variable elements of the synchronizing circuit such as voltage or current thereof.

In order to obviate the trouble of such manual adjustment the applicant has proposed a new system as will be described hereinunder with reference to FIGS. 1, 2 and 3. As shown in FIG. 1, a signal input terminal 10 is connected to a synchronizing circuit 11 while a signal which is the same as or synchronous with the signal input to the synchronizing circuit 11 is applied to a sampler circuit 13 via an input terminal 12 whereby a sampled waveform is treated by a synchronism control circuit 14 and the output therefrom is supplied to the synchronism control circuit 11 to control variable elements thereof. The synchronizing circuit 11 operates to differentiate the sampled waveform to stop to vary the variable elements thereof so as to automatically maintain the established condition when the amplitude of the differentiated waveform reaches a minimum value. Thus, by denoting the sampled and maintained waveform by sampler circuit 13 by $V(t)$ and the differentiated waveform by $y$, a following equation holds:

$$Y=dV(t)/dt$$

And the absolute value of $Y$, $|Y|$, represents the minimum value when the synchronism is reached. Upon varying the variable elements of the synchronizing circuit from their lower limits to their upper limits or over the entire range thereof the absolute value $|Y|$ manifests its minimum value at one or several points, as shown in FIG. 2. Although for the sake of description there is shown in FIG. 2 a plot of $|Y|$ manifesting only one minimum value, following consideration is similarly applicable for the cases wherein the absolute value manifests a plurality of minimum values. In FIG. 2, the abscissa X represents the variable elements and the value of X at which the absolute value $|Y|$ reaches its minimum value is denoted by Xo. When X is varied until the minimum value of $|Y|$, that is $|Y|$min. or a value very close thereto is reached, X is fixed to that point. Then the value of X at that time is very close to Xo. When the synchronism is out of step owing to a variation in condition, for example, variation in amplitude or frequency of the input signal, X begins to vary again to obtain a value of $Y$ equal to or very close to $|Y|$ min. and is then fixed at that point. FIG. 3 shows a block diagram of one example of the synchronism control circuit 14 providing such a control operation. The synchronism control circuit 14 comprises a differentiation circuit 141 to differentiate the sampled waveform and a control-signal-generating circuit 142 to control the variable elements of the synchronizing circuit 11.

With a synchronizing system utilizing a synchronism control circuit, although it is able to effect automatic synchronization, one disadvantage will be resulted when such a synchronizing system is applied to a sampling circuit which is to be discussed with reference to FIGS. 4 and 5. FIG. 4 shows a block diagram of a sampling oscilloscope wherein a signal to be measured is applied to an input terminal 41 of a sampler 42 and a synchronizing signal synchronous with the signal to be measured is applied to an input terminal 44 of a synchronizing circuit 45. Upon application of a pulse synchronous with the synchronizing signal to a high-speed sawtooth wave generator 46, it will supply a high-speed sawtooth wave to a comparator 47. When the level of this high-speed sawtooth wave matches with that of a low-speed sawtooth wave (which may be a stepped waveform synchronous with the sampling pulse) from a low-speed sawtooth wave generator 49, the sampling pulse generator 48 is put into operation to generate a sampling pulse of very narrow width synchronous with said sawtooth waves. The sampling pulse is supplied to the sampler 42 to effect sampling of the wave to be measure supplied to the input terminal 41 and to amplify and shape the sampled wave. The shaped wave is applied to an output terminal 43. This output terminal comprises the Y-axis terminal of an oscilloscope while the output terminal 50 the X-axis terminal.

Assuming now that signal waveform applied to input terminal 41 is a sine wave, then the output waveform from terminal 43 will be as shown by the curve in FIG. **5*a* as a stepped waveform 35 generally similar to the sine wave of the input which will appear at said Y-axis output terminal 43. FIG. 5*b* shows the output waveform 37 from the low-speed sawtooth wave generator 49 under this condition. During an interval 38 of the low-speed sawtooth wave 37 the waveform 35 is displayed on the screen of the oscilloscope and during a flyback interval corresponding to the sum of intervals 39 and 40 waveforms 36 and 36' are displayed. However, when waveforms such as 35 and 36 are applied to the synchronism control circuit shown in FIGS. 1 and 3 as the sampled waveform $V(t)$, the differential $Y$ provided by the differentiation circuit 141 will show an extremely higher value in interval 39 than in interval 38. Accordingly even when a preferred synchronism is obtained in interval 38, in interval 39** owing to a rapid increase in the absolute value $|Y|$ a phenomenon resembling the out-of-synchronization condition will result to cause actual loss of synchronization.

SUMMARY OF THE INVENTION

It is therefore an object of this invention to prevent the occurrence of such a out-of-synchronization phenomenon in the flyback interval.

Thus this invention contemplates to temporarily stop the operation of the synchronism control circuit over the interval of 39, and if required also over interval 40 of the low-speed sawtooth wave 37.

Briefly stated, in accordance with this invention, in a sampling device including a synchronizing device comprising a synchronizing circuit, a sampler, and a synchronism control circuit adapted to differentiate the output of the sampler to vary a variable element of the synchronizing circuit so as to stop variation of the variable element and to maintain the stopped condition when synchronism is reached, there is provided an automatic synchronizing system including means to stop the control operation of the synchronism control circuit over a flyback interval of a low-speed sawtooth wave applied to the Y-axis terminal of an oscilloscope so as to prevent loss of synchronization occurring during the flyback interval.

BRIEF DESCRIPTION OF THE DRAWING

This invention can be more fully understood from the following detailed description when taken in conjunction with the accompanying drawing in which.

DESCRIPTION OF THE PREFERRED EMBODIMENT

Figure 1:
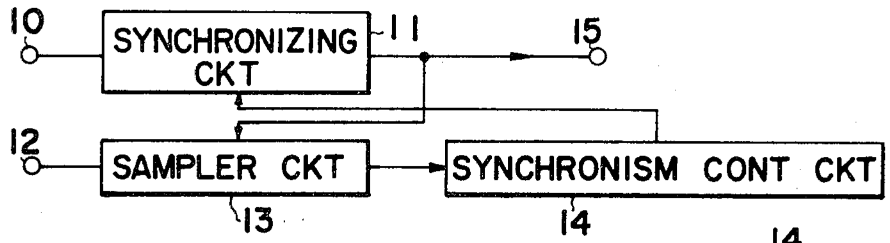
FIG. 1 shows a block diagram of an automatic synchronizing system corresponding to applicants' copending application Ser. No. 851,589.
Figure 3:
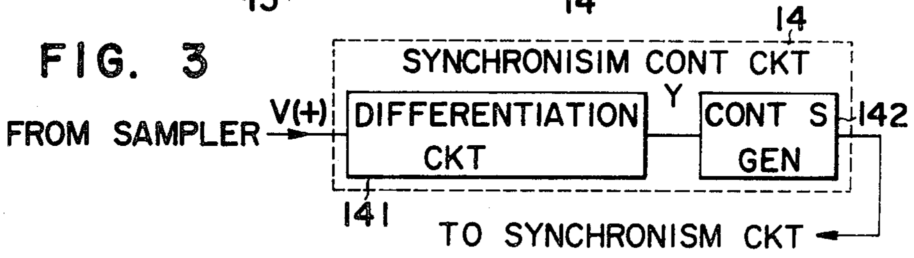
FIG. 3 shows a block diagram of a synchronism control circuit utilized in the system shown in FIG. 1.
Figure 2:
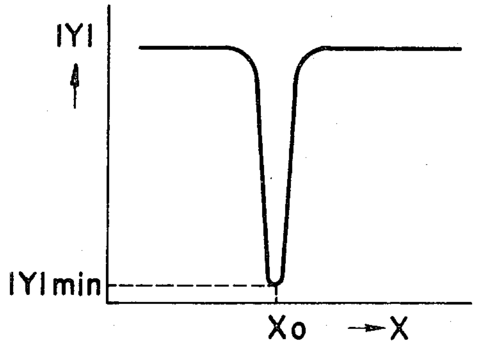
FIG. 2 is a plot to explain the operation of the automatic synchronizing system shown in FIG. 1.
Figure 4:
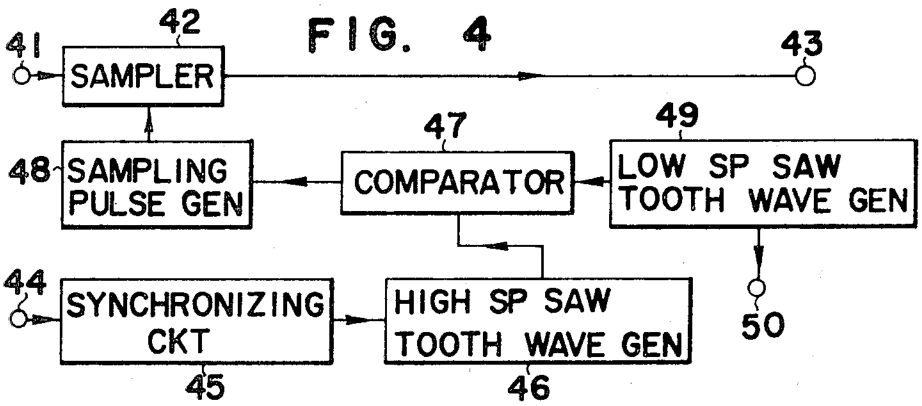
FIG. 4 shows a block diagram of a sampling oscilloscope.
Figure 5A:
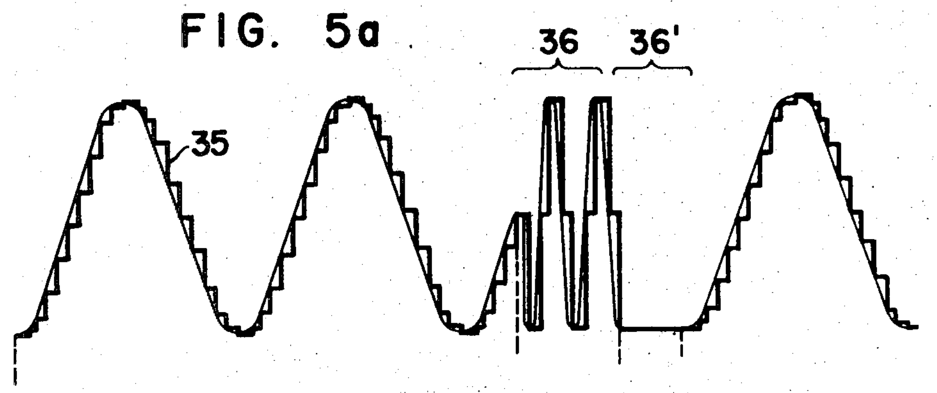
FIG. 5 shows waveforms helpful to explain the operation of the oscilloscope shown in FIG. 4.
Figure 5B:
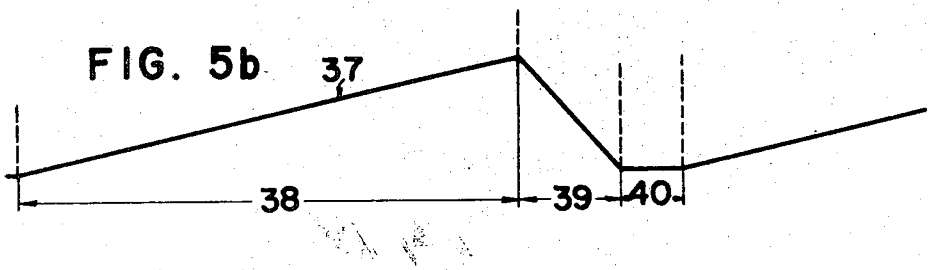
Figure 6:
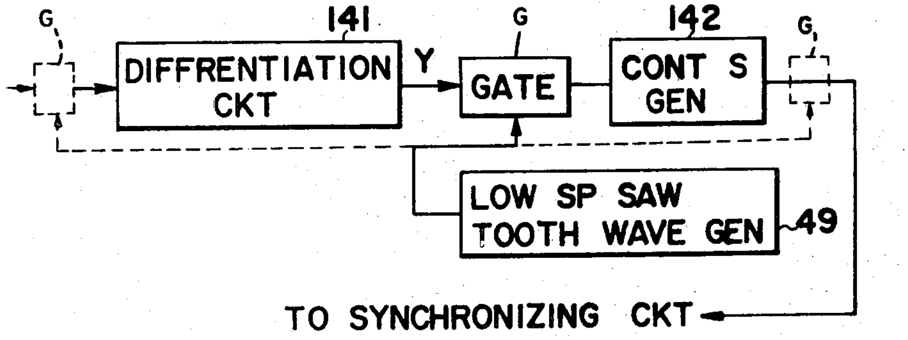
FIG. 6 is a block diagram of one embodiment of this invention.

As shown in FIG. 6, the output terminal of a differentiation circuit included in a synchronism control circuit of the type described hereinabove, is connected to a gate circuit G which receives its gating signal from a low-speed sawtooth wave generator 49. More particularly, during the flyback interval of the low-speed sawtooth wave generated by the generator 49, the gate circuit G is disenabled to prevent the differential Y from passing through the gate circuit thus stopping sending out of a variable control signal from a control signal generator to a synchronizing circuit 11. While in this embodiment, the gate circuit G is shown as interposed between differentiation circuit 141 and control signal generator 142, it is to be understood that this invention is not limited to this particular arrangement. Thus, the gate circuit may be provided on the input of the differentiation circuit 141 or on the output of the control signal generator 142. Alternatively, it is also possible to stop the operation of the control signal generator 142 over the flyback interval of the low-speed sawtooth wave.

Thus this invention provides a novel automatic synchronizing system for a sampling device such as a sampling oscilloscope wherein a synchronizing circuit is controlled by a synchronism control circuit to vary a variable element in the synchronizing circuit so that upon reaching synchronism the varying operation of the variable element is automatically stopped and the stopped state thereof is maintained, said automatic synchronizing system being characterized by means to stop operation of the synchronism control circuit over the flyback interval of a low-speed sawtooth wave supplied to a deflection axis of the sampling oscilloscope.

What is claimed is:

1. In a sampling device including a synchronizing device comprising a synchronizing circuit having a variable element, a sampler, an oscilloscope connected to the output of said sampler and a synchronism control circuit, said synchronism control circuit comprising a differentiation circuit, a gate circuit, a control signal generator, and a low-spped sawtooth wave generator connected to said gate circuit to control the operation thereof to stop the operation of said synchronism control circuit over the flyback interval of a low-speed sawtooth wave supplied to one deflection axis of said oscilloscope from said generator to prevent loss of synchronization which otherwise tends to occur during said flyback interval.

2. The automatic synchronizing circuit according to claim 1 wherein said gate circuit is provided on the input side of said differentiation circuit.

3. The automatic synchronizing circuit according to claim 1 wherein said gate circuit is provided on the output side of said control generator.

* * * * *